Nov. 3, 1964  K. A. MILETTE  3,155,202
ARCHITECTURAL SCREEN AND BUILDING UNIT THEREFOR
Filed Feb. 29, 1960  4 Sheets-Sheet 1
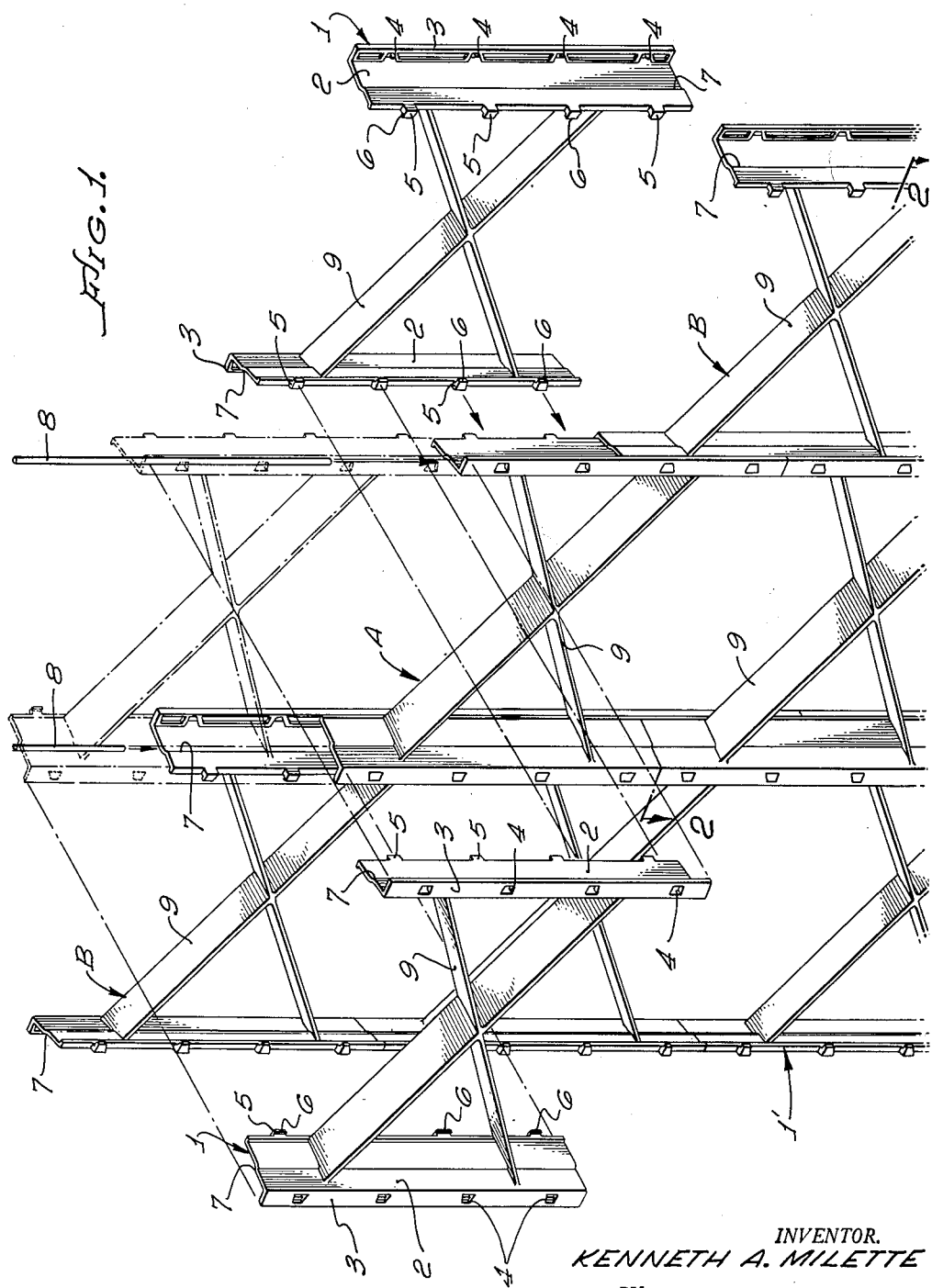
INVENTOR.
KENNETH A. MILETTE
BY
Paul A. Weilein
ATTORNEY.

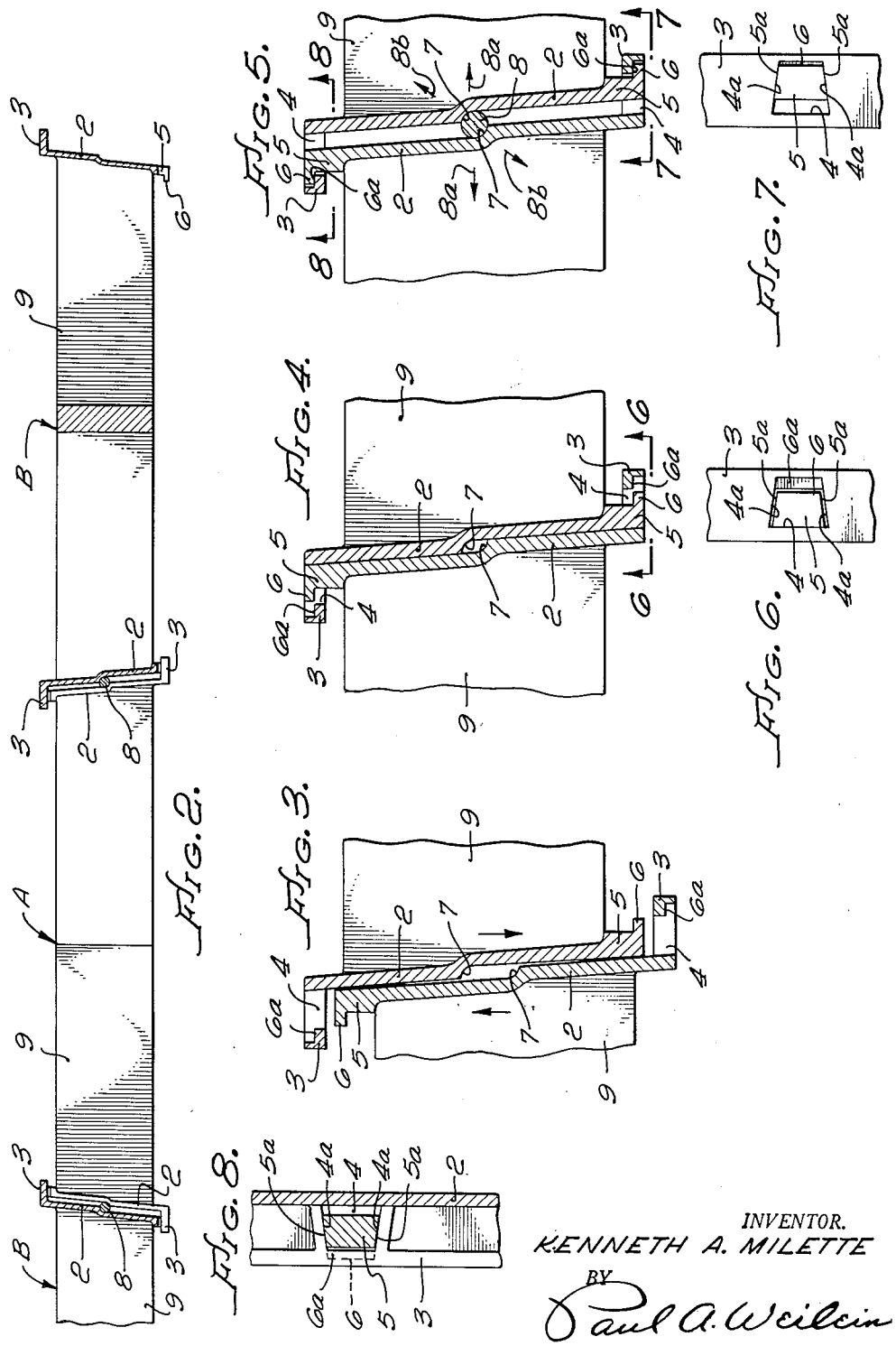

Nov. 3, 1964    K. A. MILETTE    3,155,202
ARCHITECTURAL SCREEN AND BUILDING UNIT THEREFOR
Filed Feb. 29, 1960    4 Sheets-Sheet 3
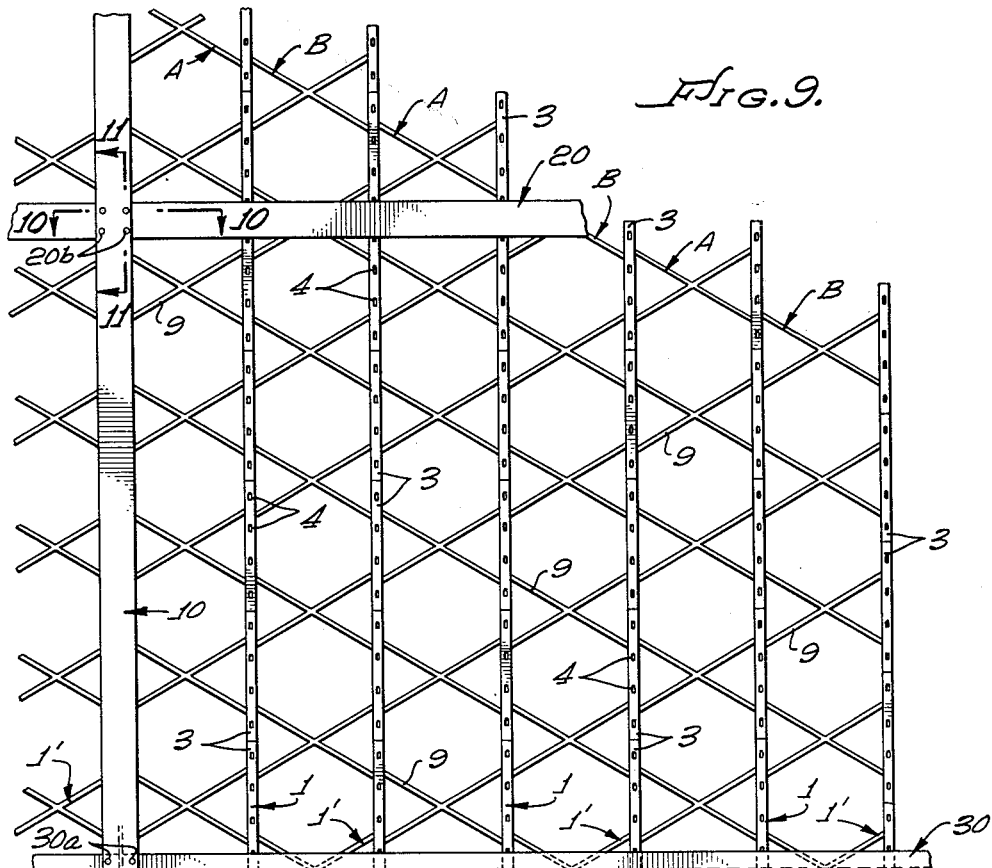
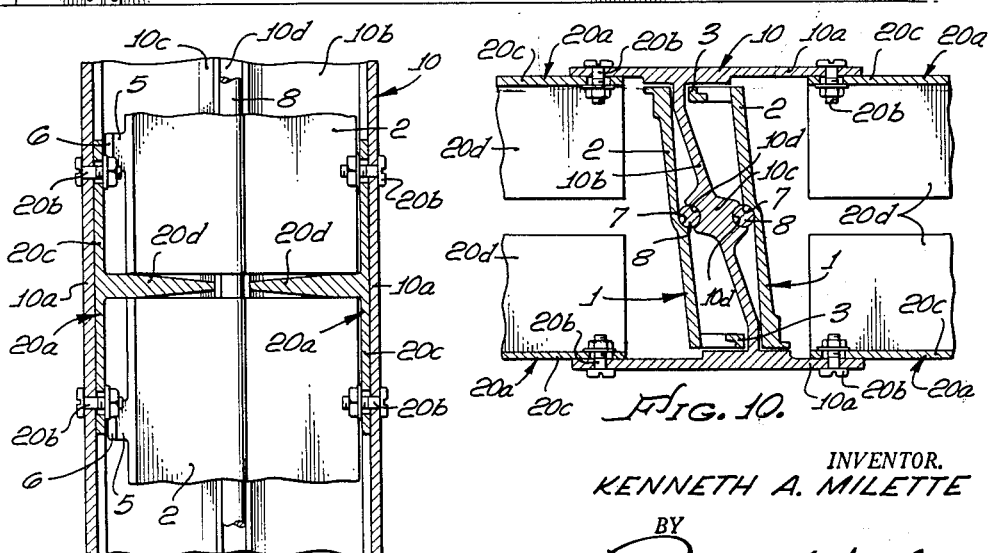
INVENTOR.
KENNETH A. MILETTE
BY
Paul A. Weilein
ATTORNEY.

Nov. 3, 1964 K. A. MILETTE 3,155,202
ARCHITECTURAL SCREEN AND BUILDING UNIT THEREFOR
Filed Feb. 29, 1960 4 Sheets-Sheet 4
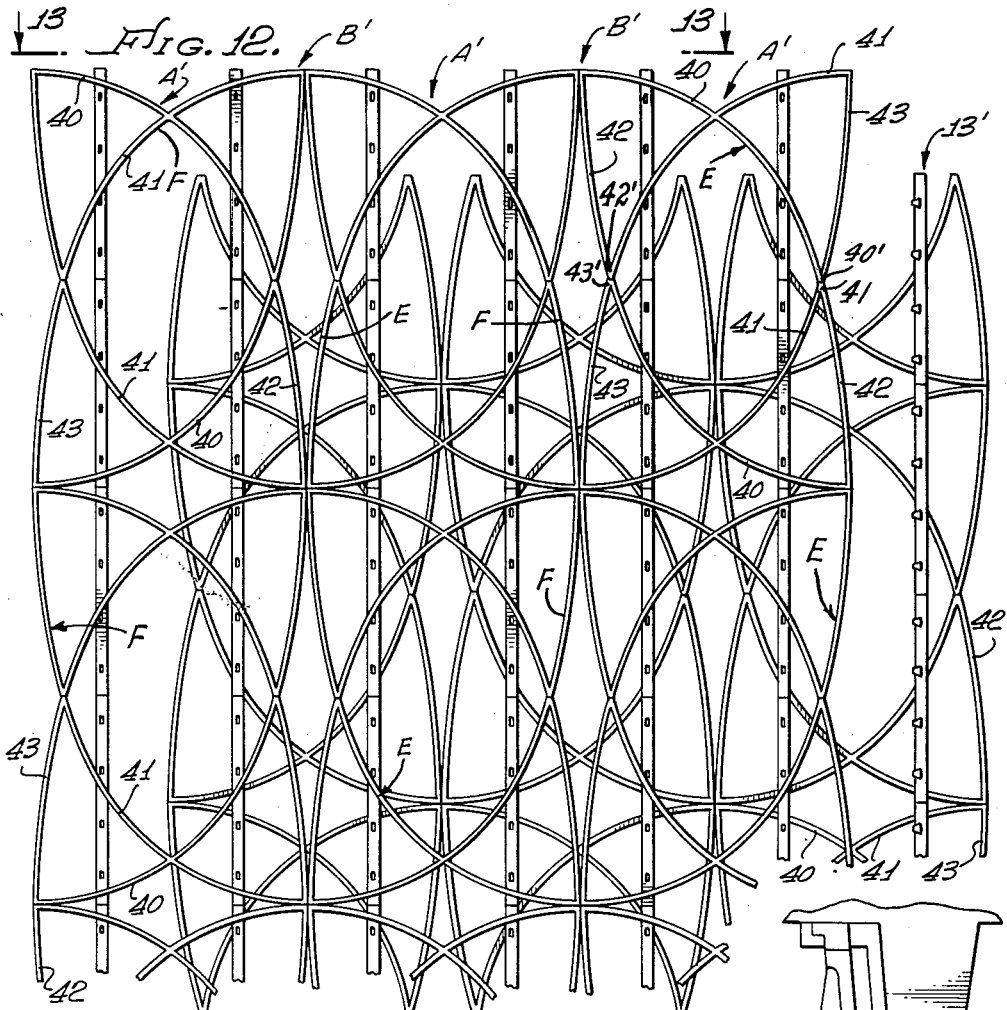
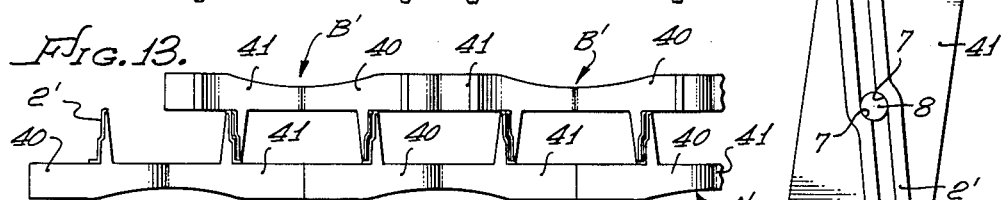
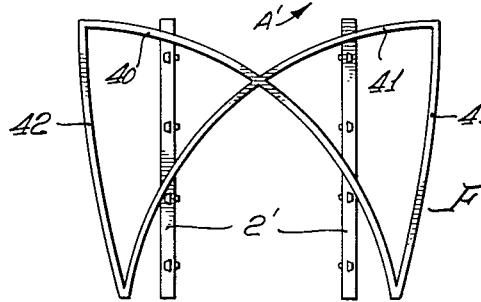
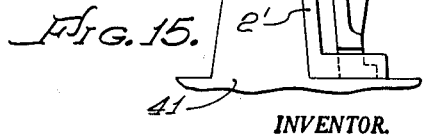
INVENTOR.
KENNETH A. MILETTE
BY
Paul A. Weilein
ATTORNEY.

United States Patent Office

3,155,202
Patented Nov. 3, 1964

1

3,155,202
ARCHITECTURAL SCREEN AND BUILDING
UNIT THEREFOR
Kenneth A. Milette, La Puente, Calif., assignor to Mission-West Manufacturing Company, Los Angeles, Calif., a corporation of Delaware
Filed Feb. 29, 1960, Ser. No. 11,859
12 Claims. (Cl. 189—34)

The present invention relates to architectural screens which are employed to enhance the appearance of buildings of various kinds, both exteriorly and interiorly, as for example, office buildings, factories, private homes and the like.

Heretofore various types of architectural screens have been used. Those composed of cement blocks require substantial skill of a mason in laying the cement blocks if the desired aesthetic appeal is to be attained. Moreover, the nature of molded cement blocks is such that there are significant limitations on the variety of designs or patterns available in screens composed of cement blocks, and the surface finish of cement blocks imposes a serious limitation on the desirability of such screens in many instances. Plastic architectural screens and sheet metal screens are also employed with apparent limitations in respect to strength and durability and economy of utilization, particularly bearing in mind the relative weakness and short life of most plastic materials in exterior applications, and the comparative cost involved in the forming of appropriate architectural screens from sheet metals. Moreover, sheet metal architectural screen constructions are limited in their design possibilities. Thus, architectural screens heretofore available have posed problems in respect to economy and durability.

With these problems of known architectural screens in view, it is an object of the present invention to provide an architectural screen construction, and particularly to provide small, easily handled building units from which an architectural screen of a desired size may be erected.

Another object is to provide an architectural screen having substantial strength and rigidity so as to withstand vibrations due to the pressures applied thereto by high velocity winds, as well as having such structural strength as to be advantageously constructed in sizes ranging from a relatively small screen area to a screen of rather substantial extent.

Another object is to provide a building unit for architectural screens which may very easily be die cast of metal, with which a suitable and desired decorative effect may be attained, and with which a screen of the desired area may be constructed by assembling a suitable number of identical building units. In accordance with this objective, the building unit is composed of a pair of similar side walls or short column sections disposed in parallel spaced relation and interconnected by ornamental latticework, these side walls being so constructed as to interlock with a similar building unit side wall to thus enable the erection of an oranamental latticed architectural screen of any desired aesthetic character.

More specifically, it is an object to provide an architectural screen building unit as referred to in the next preceding object, wherein the side walls or short column sections of each building unit are provided with means which are engageable with the side walls of a similar building unit placed adjacent thereto and staggered longitudinally of the side walls one-half the length of the respective building units, wherein the building units are

2 readily interengaged one with another and may then be effectively interlocked by the installation between adjacent building units of a locking rod having a tendency to stress the respective building units so as to securely effect an interlock between the adjacent side walls.

In accordance with this objective, the ornamental latticework referred to above may be either fully confined between the side walls of each unit or may extend outwardly of the edges of the side walls so as to create a latticed structural screen of a desired depth. In addition, the ornamental latticework may overlap the side wall of each unit so as to project into the space between the side walls of an adjacent architectural screen unit whereby a wide variation in latticework may be availed of to produce the desired aesthetic appeal.

Other objects and advantages of the invention will hereinafter be described or will become apparent to those skilled in the art, and the novel features thereof will be defined in the appended claims.

In the accompanying drawings:

FIG. 1 is an enlarged fragmentary view in perspective of an architectural screen made in accordance with the invention and in a partial stage of completion and more particularly illustrating the procedure for assembling the architectural screen units;

FIG. 2 is a fragmentary enlarged horizontal sectional view as taken on the line 2—2 of FIG. 1;

FIG. 3 is a fragmentary sectional view illustrating the method of assembly of a pair of adjacent identical building units, the units being shown as engaged with one another prior to movement into the position for enabling their being effectively interlocked;

FIG. 4 is a view corresponding to FIG. 3, but showing the adjacent assembly units shifted to a position so as to be effectively interlocked;

FIG. 5 is a view corresponding to FIGS. 3 and 4 and showing the final step in the interlocking of the units;

FIG. 6 is a fragmentary elevational view as taken on the line 6—6 of FIG. 4;

FIG. 7 is a fragmentary elevational view as taken on the line 7—7 of FIG. 5;

FIG. 8 is a fragmentary sectional view as taken on the line 8—8 of FIG. 5;

FIG. 9 is a fragmentary view in elevation depicting an illustrative architectural screen made in accordance with the present invention;

FIG. 10 is a fragmentary sectional view on an enlarged scale, as taken on the line 10—10 of FIG. 9;

FIG. 11 is a fragmentary vertical sectional view on an enlarged scale, as taken on the line 11—11 of FIG. 9;

FIG. 12 is a fragmentary front elevational view of a modified architectural screen composed of units made in accordance with the invention;

FIG. 13 is a fragmentary top plan view as taken on the line 13—13 of FIG. 12;

FIG. 14 is a front elevational view of a screen building unit as employed in the screen of FIG. 12; and FIG. 15 is an enlarged detail view in top plan showing the interlocking relation of adjacent side walls of a pair of the units of FIG. 14.

Like reference characters in the several views of the drawings and in the following description designate corresponding parts.

Referring first to FIG. 1, a decorative architectural screen embodying the invention is shown as comprising adjacent columns of identical building units generally designated 1. Portions of three columns of building units are shown in FIG. 1 which for purposes of facilitating an understanding of the invention are identified as column A disposed between a pair of columns B, B. While the units of columns B and the units of column A are identical, the units in column A have been rotated about their longitudinal axis 180° so as to be opposed to the units of columns B in face-to-face relation as will more particularly appear hereinafter.

Each of the units 1 comprises a pair of longitudinally extended side walls or short columns 2, 2 having along one side an outstanding flange 3. Each of the flanges 3 is provided with a plurality of longitudinally spaced openings 4 therethrough. At the opposite edge of the side walls 2 from the flange 3 each side wall is provided with a plurality of outstanding lugs 5 spaced along the wall as are the openings 4 in the flange 3. Each lug 5 is undercut so as to provide a locking cleat 6 of a size and shape complemental to the size and shape of the openings 4 in the flange 3 of each side wall 2 so that when the units 1 are turned face to face as afore-mentioned, the lugs of one unit may be received in the openings 4 in the opposed unit. In this connection, it should be observed that the spacing of the lugs and openings 5 and 4, respectively, is such that the units may be interconnected in longitudinally staggered relation, preferably the offset of the units when assembled being one-half the length of the respective units as clearly shown in FIG. 1.

The unit 1 at the left-hand side of FIG. 1, in assembling an architectural screen as shown therein, is moved into place in alignment with the existing column A, and the lowermost lugs 5 on the left-hand wall 2 thereof will be engaged in the recess 4 in the upper half of the topmost unit 1 of the left-hand column B, while the lugs 5 on the upper half of the right-hand side wall of the topmost unit of column B will project into the lowermost recesses 4 in the flange 3 of the left-hand side wall of the unit being added to the intermediate column A. Thereafter, upon adding to the right-hand column B the unit 1 shown at the right-hand side of the drawings, the uppermost lugs 5 on the just-mentioned unit will be engaged in the openings 4 at the lower half of the previously applied unit in column A while the two lugs 5 at the lower half of the unit being added to column B will engage in the upper pair of recesses 4 in the unit in column A just below that which has just been applied thereto.

Likewise, the lower pair of lugs 5 on the right-hand side wall of the just-applied unit in column A will engage in the uppermost pair of recesses 4 in the unit which is being applied to the right-hand column B, and the uppermost pair of lugs 5 on the uppermost unit 1 in column A below the unit shown in broken lines will engage in the lowermost pair of recesses in the left-hand side wall 3 of the unit 1 being added to the right-hand column B. This assembly and the relationship of the newly applied units in column A and the right-hand column B is clearly shown in broken lines in FIG. 1.

Intermediate its longitudinal edges each side wall or short column 2 of the unit 1 is offset slightly so as to provide an elongate, preferably arcuate shoulder 7 on its outer surface. When the units are disposed in face-to-face relation with the lugs 5 engaged in the openings 4, the shoulders 7 of the respective units are opposed to one another as will be more particularly pointed out hereinafter, so as to form a channel for the reception of a locking rod 8 which may be inserted lengthwise into the channels between the shoulders 7.

FIG. 2 illustrates the assembled screen of FIG. 1 in section with the rods 8 in position to effect an interlocking of the complemental units as is progressively illustrated in FIGS. 3–8. In assembling the units when they are turned face to face, it will be noted in FIG. 3 that the side walls of the unit are angularly disposed and are substantially parallel to one another so as to enable the reception between the side walls of one unit of the side walls of the adjacent unit upon movement of the respective units in the direction of the arrows in FIG. 3. Upon such movement it will be noted (see FIG. 4) that the lugs 5 of the respective units are disposed in the recesses 4 of the adjacent unit, while the arcuate shoulders 7 of the respective units form a passage extending longitudinally between the opposed side walls 2. In this condition it will be noted that the units are free to be separated until such time as the locking rod 8, as shown in FIG. 5, is inserted into the recess defined between the shoulders 7, 7 of the units to produce a force tending to move the units relatively laterally, that is, in the direction of the arrows designated 8a in FIG. 5 so that the cleats 6 on the respective lugs 5 are brought into interlocking engagement with a shoulder 6a formed at one side of the recesses 4 in the flanges 3 of the respective units. In addition, the locking rod 8 exerts a force in the direction of the arrows 8b in FIG. 5 tending to stress the locking cleats 6 into tight pressure engagement with the just-mentioned shoulders 6a, whereby a secure assemblage is provided which is not subject to vibration and rattle when subjected to high velocity winds or the like or when subjected to vibrations from the passing of heavy vehicles or from other causes.

In order to effect a tight interlocking relationship between the assembled units 1, the rod 8 is preferably slightly oversized so as to require its forceful insertion into the space defined between the arcuate shoulders 7, 7. In addition, as shown in FIGS. 6, 7 and 8, the recesses 4 are preferably provided with side walls 4a which taper toward the shoulder 6a of the flanges 3 of the units while the lugs 5 are provided with correspondingly tapered side walls 5a which are tightly wedged in the tapered side walls 4a of the recess so as to securely restrain relative vertical movement between the assembled units. Thus, the assembled units are tightly interlocked against relative movement.

Referring now to FIG. 9, there is shown a fragmentary section of a decorative architectural screen including units as previously described wherein the screen is divided into a plurality of sections as by means of vertical posts 10 and horizontal beams 20. However, it will be understood that such post and beam dividers and supports are not vital to the invention but may be employed in producing a screen of a desired size or load supporting capacity, while in other instances a screen of any desired size may be constructed without such post and beam supports.

As indicated in FIG. 10, the post 10 comprises a pair of opposed facia plates 10a having a web 10b therebetween, this web 10b is angularly disposed so as to be oppositely offset from the center of the facia plates for the reception of the side wall flanges 3 of the units 1 which are separated by the web 10b. At its midpoint the web 10b is provided with a longitudinally extended enlarged section 10c having a pair of opposed arcuate grooves 10d extending longitudinally thereof so as to provide an arcuate shoulder opposing the arcuate shoulder 7 of the adjacent units 1 whereby a locking rod 8 inserted between the enlarged section 10c of the web 10b and the side wall 2 of the adjacent units provides for a firm engagement of the respective units 1 with the post 10.

Suitably secured to the facia plates 10a of the post 10 at opposite sides of the web 10b is the beam 20 composed preferably of a pair of structural elements 20a which are generally T-shaped in cross section, these elements 20a being connected to the facia plates 10a of post 10 as by fastener means 20b extending through a face plate 20c of the respective structural elements 20a. The face plates 20c just referred to have projecting inwardly therefrom the web 20d of the structural elements 20a.

As shown in FIG. 11, the webs 20d of structural elements 20a project between the respective upper and lower ends of the units in the columns of assembled units and since the post 10 is interposed between adjacent columns of units, each panel or section of the decorative screen is a separate structural entity, but the gap between the webs 20d of structural elements 20a enables the passage therebetween of the locking rod 8.

Preferably, in order to finish off a screen at its upper and lower borders, appropriate half units are provided as indicated at 1' in FIG. 1 at the lower end of the left-hand column B. In this connection, it will be understood that since the units in adjacent columns are offset one-half the length of a unit, half units would be required at the lower border in each of the columns B and in the intermediate column A at the upper border.

Any appropriate means may be availed of for finishing the lower border of the architectural screen hereof, and in the illustrative embodiment as shown in FIG. 9, a T-element 30 is employed and secured to the column 10 as by fasteners 30a in the manner of the beam supports 20. It will be recognized that the T-element 30 is constituted in the illustrative embodiment by one of the beam support structural elements 20a.

As has been previously mentioned, the units 1 may be constructed to provide any desired decorative effect and, indeed, a wide variety of pleasing designs may be availed of. In the embodiment thus far described, the side rails 2 are interconnected by crossed elements or webs 9 which lie wholly within the confines of the side walls 2 so that in the assembled screen the edge flanges 3 of the assembled units constitute a vertical divider between the ornamental crossed members 9 in the respective columns. One obvious variation of this design would be to assemble the units in vertically spaced rows, i.e., with the walls of the respective units extending horizontally.

In addition, the invention contemplates a unit for assembly in an architectural decorative screen where the ornamental effect is not interrupted or divided by the edge flanges 3 of the units, but instead, the decorative elements interconnecting the walls of the units project at least midway of the side wall flange or project beyond the flange at each side of the unit to a point midway between the walls of the adjacent unit, and in either case, the units are complementary.

Referring to FIG. 12, there will be observed an exemplary complex three-dimensional pattern derived from the building unit shown in FIG. 14. This unit includes side walls 2' corresponding in every respect with the units previously described, as indicated in FIG. 15, so that the side wall construction and interlocking means need no further description.

However, it will be noted that in this illustrative embodiment the decorative webbing is not disposed wholly between the walls, but projects outwardly from the wall edges so as to produce a screen construction having greater depth. Moreover, the decorative webbing, instead of terminating at the side walls, projects beyond the latter one-half the width of the building unit. The webbing, as shown in FIG. 14 particularly well, is composed of arcuate sections 40 and 41 which intersect midway of the unit and extend respectively from a point in the plane of the upper and lower ends of the walls 2', a distance one-half the width of the unit beyond the walls at their upper ends, and one-fourth the width of a unit at the lower end as viewed in FIG. 14. The extreme ends of the webs 40 and 41 are interconnected by arcuate segments 42 and 43.

As a result of the webs 40 and 41 projecting laterally of the unit one-half the width thereof at one end and one-fourth the width thereof at the other end, it will be observed in FIG. 12 that when the units are assembled in columns designated alternatively A' and B', a most unique decorative screen evolves.

The same assembly method as previously described is employed, that is, the units when turned face to face in the respective columns are offset one-half the length of one another, and in addition, the units in the respective columns are inverted so that, as denoted in the right-hand column A', the juncture 42' of webs 41 and 42 also the juncture 40' of webs 40 and 43 of the uppermost unit in the right-hand column A' are adjacent the juncture 43' of the webs 40, 43 and the juncture 41' of the webs 41 and 42, respectively in the subjacent unit in the right-hand column A'. Accordingly, the two units just referred to in the right-hand column A' combine to provide the upper right-hand quarter of a large ellipse which is formed by web portions designated E,E,E and E with webs 40 and 42 of the topmost end next to the top units in right-hand column A', as well as the upper left-hand quarter of a large ellipse by the webs 41, 43 of these units, respectively. The third and fourth units from the top of right-hand column A', it will be observed, form the lower right-hand quarter of one ellipse and the lower left-hand corner of the other ellipse referred to above, and the middle column A' completes the ellipse E,E,E, and E and provides half of a second ellipse designated by web portions F,F,F, and F having its minor axis aligned with the ellipse which is completed thereby, and its major axis offset the width of two units, i.e., from the middle of column B' of middle column B' to the middle of the left-hand column B' designated in FIG. 12. Thus, the design may be repeated ad infinitum.

At the rear of the screen shown in FIG. 12 in the event that columns B' are composed of units having identical webbing as that used on the frontal side of the screen of FIG. 12, the identical design will be produced in the background, but offset one-half the length of one of the building units. It will be appreciated, however, that if desired, a unit such as that shown in the first-described embodiment may be employed in the rear columns B' so as to produce still a different effect, and in fact, variations in specific design characteristics may be availed of by employing combinations of units having various webbing structures, curvatures and the like. It will also be apparent that various color combinations may be availed of to produce desired variations in the overall aesthetic qualities of the screen.

It will now be apparent that the invention provides a building unit for architectural decorative screen which may be readily constructed by die casting units in a single operation and that the resultant units, when opposed to one another in face-to-face relation and interlockingly engaged one with the other, are securely and rigidly co-engaged so as to constitute a strong structural column, and the interlocked units are incapable of rattle due to vibration, while at the same time innumerable pleasing and ornamental effects may be attained by variations in the web means which bridge the side walls either within the walls or projecting outwardly beyond the walls. Moreover, the decorative screen may be quickly assembled at the site of its use either in an upright applied position or in a horizontal prefabricated position, so to speak, where the units are assembled on the ground and the assembled screen moved into place as a finished screen, depending upon the size of the screen desired.

Though the units are preferably cast of metal it will be understood that they may also be cast of plastic materials and certain of the advantageous features of the invention will be availed of. In this connection the modern day plastics having long exterior life may be employed to advantage if desired.

While the specific details of two illustrative embodiments of the architectural screen building units and screens derived therefrom have been herein shown and described, it will be apparent that changes and alterations may be resorted to not only in the mechanical details of construction, but also in the ornamental effect attained by the screen, without departing from the spirit of the invention as defined in the appended claims.

I claim:

1. An architectural screen building unit comprising: a pair of identical longitudinally extended side walls extending in parallel relation to one another and having complemental interlocking means along longitudinal edges of said side walls co-engageable with a similar unit when disposed in opposed face-to-face relation thereto; and web means bridging said side walls and projecting outwardly therefrom in overlapping relation to said side walls; said web means intersecting said longitudinal edges at points spaced from said interlocking means.

2. An architectural screen building unit comprising: a pair of identical longitudinally extended side walls extending in parallel relation to one another and having complemental interlocking means co-engageable with a similar unit when disposed in opposed face-to-face relation thereto; web means bridging said side walls; said interlocking means including locking lugs disposed in spaced relation along the corresponding edges of each of said side walls; and means outwardly offset from said side walls providing recesses disposed along the opposite corresponding edges of said side walls from said lugs for the reception of said lugs when a pair of said units are co-engaged in opposed face-to-face relation.

3. An architectural screen building unit comprising: a pair of identical longitudinally extended side walls extending in parallel relation to one another and having complemental interlocking means co-engageable with a similar unit when disposed in opposed face-to-face relation thereto; web means bridging said side walls; said interlocking means including locking lugs disposed in space relation along the corresponding edges of each of said side walls; and recesses disposed along the opposite corresponding edges of said side walls from said lugs for the reception of said lugs when a pair of said units are co-engaged in opposed face-to-face relation; there being an equal number of lugs and recesses on said side walls correspondingly spaced at opposite sides of a transverse median line extending across said side walls whereby said units are engageable with one another in longitudinally staggered relation one-half the length of said units.

4. An architectural screen building unit comprising: a pair of identical side walls extending longitudinally in parallel relation; web means bridging said side walls; co-operative interlockingly engageable means at the opposite edges of each of said side walls; said interlocking means projecting outwardly from the inner and outer surfaces of each of said side walls; and a shoulder extending longitudinally along the outer surface of each of said side walls.

5. An architectural screen building unit comprising: a pair of identical side walls extending in parallel relation; means bridging said side walls; a plurality of lugs projecting laterally outwardly along the corresponding edges of each of said side walls; and a flange projecting outwardly from the other corresponding edges of each of said side walls; said flange having a plurality of recesses therein spaced similarly to said lugs; said recesses being formed for reception of the lugs of a complemental unit when assembled therewith.

6. An architectural screen building unit comprising: a pair of identical side walls extending in parallel relation; means bridging said side walls; a plurality of lugs projecting laterally outwardly along the corresponding edges of each of said side walls; and a flange projecting outwardly from the other corresponding edges of each of said side walls; said flange having a plurality of recesses therein spaced similarly to said lugs; said recesses being formed for reception of the lugs of a complemental unit when assembled therewith; said lugs and recesses tapering outwardly.

7. An architectural screen building unit comprising: a pair of identical side walls extending in parallel relation; means bridging said side walls; a plurality of lugs projecting laterally outwardly along the corresponding edges of each of said side walls; a flange projecting outwardly from the other corresponding edges of each of said side walls; said flange having a plurality of recesses therein spaced similarly to said lugs; said recesses being formed for reception of the lugs of a complemental unit when assembled therewith; said lugs and recesses tapering outwardly; and said side walls being each provided with a shoulder extending longitudinally along the outer side thereof.

8. An architectural screen comprising: a plurality of columns disposed in side-by-side relation; each column comprising a plurality of like building units disposed in face-to-face relation and interlockingly engaged with one another with the opposed units of each column offset one-half the length of said units; each of said units including a pair of longitudinally extended side walls and web means bridging said side walls; and means on said side walls of the respective units of one column and on the side walls of the units of an adjacent column interlocking said units and columns of units together.

9. An architectural screen comprising: a plurality of columns disposed in side-by-side relation; each column comprising a plurality of like building units disposed in face-to-face relation and interlockingly engaged with one another with the opposed units of each column offset one-half the length of said units and with the units of each column interlocked with the units of an adjacent column; each of said units including a pair of identical side walls extending longitudinally in parallel relation; each of said side walls having lugs projecting laterally from one edge thereof and a flange having recesses therein and projecting from the other edge thereof, with the lugs at one edge of the side walls of each unit engaged in the recesses of a pair of units of an adjacent column.

10. An architectural screen comprising: a plurality of columns disposed in side-by-side relation; each column comprising a plurality of like building units disposed in face-to-face relation and interlockingly engaged with one another with the opposed units of each column offset one-half the length of said units and with the units of each column interlocked with the units of an adjacent column; each of said units including a pair of identical side walls extending longitudinally in parallel relation; each of said side walls having lugs projecting laterally from one edge thereof and a flange having recesses therein and projecting from the other edge thereof, with the lugs at one edge of the side walls of each unit engaged in the recesses of a pair of units of an adjacent column; and said flanges being provided with a shoulder extending laterally with respect to said side walls and engageable by said lugs of the co-engaged units of the adjacent columns.

11. An architectural screen comprising: a plurality of columns disposed in side-by-side relation; each column comprising a plurality of like building units disposed in face-to-face relation and interlockingly engaged with one another with the opposed units of each column offset one-half the length of said units and with the units of each column interlocked with the units of an adjacent column; each of said units including a pair of identical side walls extending longitudinally in parallel relation; each of said side walls having lugs projecting laterally from one edge thereof and a flange having recesses therein and projecting from the other edge thereof, with the lugs at one edge of the side walls of each unit engaged in the recesses of a pair of units of an adjacent column; said flanges being provided with a shoulder extending laterally with respect to said side walls and engageable by said lugs of the co-engaged units of the adjacent columns; and means disposed between the co-engaged side walls of adjacent units for urging said co-engaged side walls laterally apart to effect co-engagement of said lugs and said shoulders.

12. An architectural screen comprising: a plurality of columns disposed in side-by-side relation; each column comprising a plurality of like building units disposed in face-to-face relation and interlockingly engaged with one another with the opposed units of each column offset one-half the length of said units and with the units of each column interlocked with the units of an adjacent column; each of said units including a pair of identical side walls extending longitudinally in parallel relation; each of said side walls having lugs projecting laterally from one edge thereof and a flange having recesses therein and projecting from the other edge thereof, with the lugs at one edge of the side walls of each unit engaged in the recesses of a pair of units of an adjacent column; said flanges being provided with a shoulder extending laterally with respect to said side walls and engageable by said lugs of the co-engaged units of the adjacent columns; each side wall having a longitudinally extended shoulder opposed to a corresponding shoulder on the opposed side wall; and an expander rod extending between said side walls and engaged with said longitudinally extended shoulders.

References Cited in the file of this patent

UNITED STATES PATENTS

| | | |
|---|---|---|
| 529,719 | Eils | Nov. 27, 1894 |
| 799,510 | Williams | Sept. 12, 1905 |
| 831,665 | Hill | Sept. 25, 1906 |
| 1,115,818 | Hickerson | Nov. 3, 1914 |
| 1,151,974 | Straight | Aug. 31, 1915 |
| 1,381,823 | Griffin | June 14, 1921 |
| 2,282,519 | Holmes | May 12, 1942 |
| 2,373,409 | Myer | Apr. 10, 1945 |
| 2,766,488 | Danielson | Oct. 16, 1956 |